UNITED STATES PATENT OFFICE.

JAMES WEST, OF SYRACUSE, NEW YORK.

COMPOSITION OF MATTER FOR ROOFING PURPOSES.

Specification forming part of Letters Patent No. 13,733, dated October 30, 1855; Reissued September 8, 1857, No. 491.

*To all whom it may concern:*

Be it known that I, JAMES WEST, of the city of Syracuse, in the county of Onondaga and State of New York, have invented a new and useful Composition of Matter for Roofing Purposes; and I do hereby declare the following to be a full, clear, and exact description of the same and of the manner of preparing and using the composition in question.

The nature of my invention consists in forming a compound of certain materials hereinafter mentioned, which, combined in the manner and proportion presently to be described, and applied to any slate, metallic or wooden surface, will there form a hard and durable covering, impervious to water and the action of the atmosphere. It is particularly designed for roofing. The following are the ingredients used: First, india rubber (caoutchouc) or gutta percha, dissolved in spirits of turpentine, or some other suitable solvent; gum shellac, dissolved in alcohol or other suitable solvent, and naphtha or coal tar. Second, a mixture which I call "puzzolan," and use as a drier, which may be composed of pulverized glass, quick lime, pulverized and sifted, plaster of Paris, marble dust, or any kind of clay well calcined and pulverized, or any equivalent substances, though I do not deem the use of pulverized glass, essential, nor do I wish to claim the same as an ingredient in this compound. And thirdly, a mixture which I call "smalt," and which may be composed of glass, sand, flint, gravel, pounded earthenware, or any other equivalent pulverized substances, which will withstand the action of the atmosphere. The use of lime is indispensable in the working of this cement from the fact that without it the materials do not harden, but become friable and undergo apparent decomposition. The lime on the contrary seems to have the effect of hardening and curing the mass, and rendering it capable of enduring atmospheric changes without any injurious effects. When quick lime and plaster of Paris are used as a drier, the proportions of four of the former, to one of the latter, I have found effective. The proportions of these compounds, which I have found best in practice, are as follows: sixteen ounces of naphtha or coal-tar; one ounce of india rubber or gutta percha (or half an ounce of each, if both are used), and half an ounce of shellac dissolved as above stated. Two ounces of the puzzolan or drier. And two ounces of the smalt.

The process of using the above composition is to warm the solutions of india rubber or gutta percha, gum shellac, and naphtha or coal tar to blood heat, then mix therewith the puzzolan (the drier), and immediately apply with a brush to the roof, and rub it smooth or even, then sift on the smalt while the compound is green. When used upon wood it is necessary to cover the wood with some textile fabric such as burlaps or sacking.

Having thus fully explained the nature and object of my compound, and the manner of making and using the same, what I claim therein as of my invention, and desire to secure by Letters Patent, is—

The use of lime in combination with the rubber, or gutta percha, and shellac solutions in the composition as set forth, and for the purpose specified.

JAMES WEST.

Witnesses:
SAMUEL KENT,
H. D. DIVAMA.

[FIRST PRINTED 1911.]